(12) United States Patent
Petria et al.

(10) Patent No.: US 11,076,441 B2
(45) Date of Patent: Jul. 27, 2021

(54) UNREACHABLE NODE RECOVERY IN WIRELESS MESH NETWORKS

(71) Applicant: NXP USA, Inc., Austin, TX (US)

(72) Inventors: Silviu Petrut Petria, Bucharest (RO); Elvis Gabriel Nica, Bucharest (RO)

(73) Assignee: NXP USA, Inc., Austin, TX (US)

( * ) Notice: Subject to any disclaimer, the term of this patent is extended or adjusted under 35 U.S.C. 154(b) by 236 days.

(21) Appl. No.: 16/041,990

(22) Filed: Jul. 23, 2018

(65) Prior Publication Data
US 2019/0357290 A1   Nov. 21, 2019

(30) Foreign Application Priority Data

May 21, 2018 (RO) .............................. a 2018 00357

(51) Int. Cl.
| | | |
|---|---|---|
| H04W 76/19 | (2018.01) | |
| H04W 76/18 | (2018.01) | |
| H04L 12/703 | (2013.01) | |
| H04L 29/14 | (2006.01) | |
| H04W 24/04 | (2009.01) | |
| H04L 12/707 | (2013.01) | |

(52) U.S. Cl.
CPC ............ *H04W 76/19* (2018.02); *H04L 45/28* (2013.01); *H04L 69/40* (2013.01); *H04W 24/04* (2013.01); *H04W 76/18* (2018.02); *H04L 45/22* (2013.01)

(58) Field of Classification Search
CPC ..... H04W 76/19; H04W 76/18; H04W 24/04; H04W 84/18; H04W 92/18; H04W 76/11; H04L 45/28; H04L 69/40; H04L 45/22
See application file for complete search history.

(56) References Cited

U.S. PATENT DOCUMENTS

| | | | |
|---|---|---|---|
| 6,195,327 B1* | 2/2001 | Lysejko | H04W 72/082 370/201 |
| 6,298,054 B1* | 10/2001 | Dorenbosch | H04W 88/026 370/350 |
| 8,634,327 B2 | 1/2014 | Seok et al. | |
| 9,717,037 B2* | 7/2017 | Yoon | H04W 48/14 |
| 9,986,491 B2* | 5/2018 | Jeong | H04W 48/16 |
| 10,049,023 B1* | 8/2018 | Bhalerao | H04L 41/5009 |
| 2002/0167917 A1* | 11/2002 | Stephenson | H04B 7/18508 370/319 |

(Continued)

OTHER PUBLICATIONS

Xu, Wenyuan et al., "Channel Surfing: Defending Wireless Sensor Networks from Interference", 6th International symposium on Information Processing in Sensor Networks, Apr. 25, 2007, pp. 499-508, IEEE, Piscataway, NJ, USA.

*Primary Examiner* — Hassan Kizou
*Assistant Examiner* — Abdullahi Ahmed

(57) ABSTRACT

A mesh network system is provided that enables a parent node to regain communication with a child node that is unresponsive due to bad link conditions on the currently used communication channel. The parent and the unresponsive child node are configured to respond to unreachability conditions by having synchronized transmit and reception scans for signals on each available channel. Once a determination has been made that an alternate channel is available that allows communication, embodiments further provide a mechanism for determining whether to trigger a network-wide channel switch, if, for example, the node is critical to an application supported by the network.

15 Claims, 5 Drawing Sheets

(56) References Cited

U.S. PATENT DOCUMENTS

| | | | |
|---|---|---|---|
| 2007/0204100 A1* | 8/2007 | Shin | G06F 11/1441 |
| | | | 711/103 |
| 2009/0043879 A1 | 2/2009 | Jamieson et al. | |
| 2009/0046673 A1* | 2/2009 | Kaidar | H04W 48/12 |
| | | | 370/337 |
| 2009/0129273 A1* | 5/2009 | Zou | H04L 45/24 |
| | | | 370/235 |
| 2009/0323609 A1* | 12/2009 | Walton | H04W 48/16 |
| | | | 370/329 |
| 2011/0149759 A1 | 6/2011 | Jollota | |
| 2013/0077552 A1* | 3/2013 | Lee | H04W 72/082 |
| | | | 370/312 |
| 2015/0350987 A1 | 12/2015 | Chatterjea et al. | |
| 2016/0019663 A1* | 1/2016 | Mani | H04L 67/2842 |
| | | | 700/291 |
| 2017/0027003 A1* | 1/2017 | Kojima | H04W 28/065 |
| 2018/0317070 A1* | 11/2018 | Li | H04W 52/0209 |

* cited by examiner

UNREACHABLE NODE RECOVERY IN WIRELESS MESH NETWORKS

BACKGROUND

Field

This disclosure relates generally to multi-channel wireless personal area networks, and more specifically, to a mechanism for restoring communication with a node having become unreachable, for instance, due to poor link conditions on a currently used RF channel.

Related Art

Wireless networking technology has become widely adopted in a number of application areas, enterprises, and residential communities. One consequence of this wide and varied use of wireless networks is interference between different systems, which can affect the operational performance of the networks. This is especially true due to many of the wireless technologies operating in similar communication bands (e.g., 2.4 GHz for WiFi, Bluetooth, Zigbee, and Thread).

Wireless network systems that operate in critical areas (e.g, medical or security) should be sufficiently robust to provide reasonably continuous service, which means that those networks should be capable of maintaining communication in spite of certain levels of radio interference. Radio interference can be generated in a number of ways, including, for example, by any electrical device that emits radio waves with sufficient power in a frequency that is approximately equal to the operating frequency of the wireless network, and natural phenomena such as lightning or solar flares. Such radio interference can degrade performance of the network, causing disruption of communication between nodes.

Some wireless networks are configured with nodes in a parent-child relationship. As the network grows a newly added node becomes a child of an existing node. When a child node in the network system becomes unresponsive, the parent of that node can attempt to regain communication with the child. Typically, during a period the parent may transmit messages to the child on each available channel, while the child listens on one channel. In the next period, the child will switch to a subsequent channel while the parent transmits again on each available channel. This process continues until communication is resumed, or until it is concluded that the child node is unreachable. But during this period, the communication radio of the parent is unavailable to communicate with any other child of the parent on the original channel. Further, significant power resources can be consumed by the parent's use of the radio in this manner.

In a multi-channel network system, a solution to interference is to move the system working frequency to a clear channel. In a multi-hop mesh topology, router nodes perform an end-to-end routing function. As a result of the redundancy in routes between any two nodes and self-organization, mesh topologies are robust to changes in the number of nodes and the ambient environment. But these features also increase the complexity of switching the network system to a different channel. Thus, it may not be desirable to switch the network system's channel in response to every loss of communication event.

It is therefore desirable to provide a power- and time-efficient mechanism for determining a channel on which communication can be restored between a parent and child node in a mesh network. It is further desirable to provide a mechanism for determining whether the communication channel for entire mesh network system should be switched in response to finding a channel on which the parent and child can communicate.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mesh network system that enables a parent node to regain communication with a child node that is unresponsive due to bad link conditions on the currently used communication channel. The parent and the unresponsive child node are configured to respond to unreachability conditions by having synchronized transmit and reception scans for signals on each available channel. Once a determination has been made that an alternate channel is available that allows communication, embodiments further provide a mechanism for determining whether to trigger a network-wide channel switch, if, for example, the node is critical to an application supported by the network.

A wireless mesh network is a communications network made up of radio nodes organized in a mesh topology. Wireless mesh networks typically consist of mesh routers, mesh clients or end nodes, and gateways. In a typical mesh network, the nodes are not mobile but instead are static in location so that route computations are relatively stable. Of particular interest are wireless personal area networks (WPANs) such as those defined under IEEE 802.15.4, which provide simple, low-cost communications using wireless connectivity with limited power. In WPANs, objectives such as ease of installation, reliable data transfer, low cost, and reasonable battery life are met, while maintaining a simple and flexible protocol.

A WPAN, as defined under 802.15.4, can include two different types of nodes: a full-function device (FFD) and a reduced-function device (RFD). A FFD is a device that is capable of acting as a coordinator of the network. FFDs can provide routing functionality (transmitting or receiving) and other device functions. A RFD is a device that cannot function as a coordinator of the network, but can provide transmitting or receiving functions along with other device functions. There is only one FFD configured as the network coordinator in a WPAN. The network coordinator forms the first cluster of the network and also stores critical information regarding the network. The network coordinator also performs network management decisions on behalf of the network.

Figure 1:
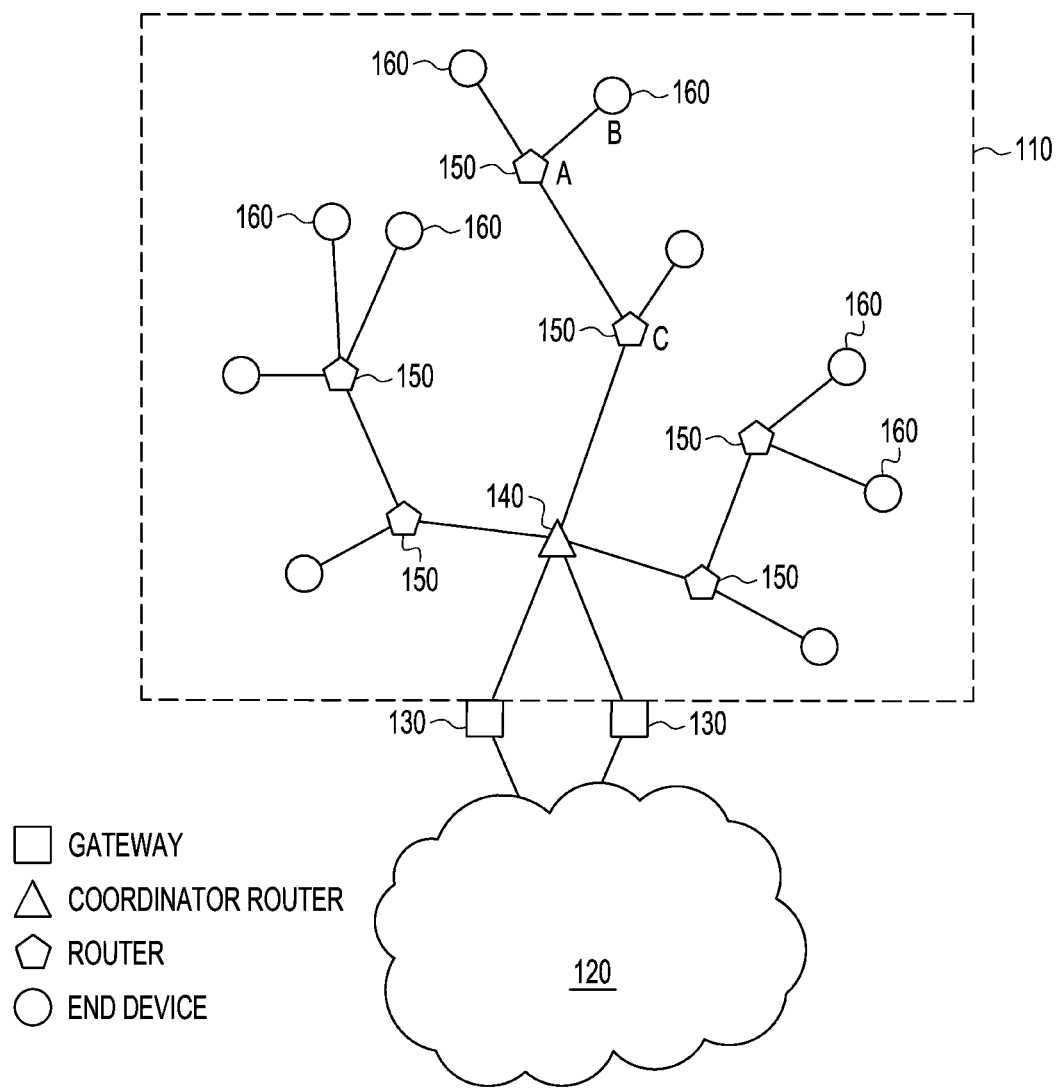
FIG. 1 is a simplified block diagram illustrating an example of a wireless mesh network within which embodiments of the present invention are configured to operate.

FIG. 1 is a simplified block diagram illustrating an example of a wireless mesh network within which embodiments of the present invention are configured to operate. Wireless mesh network 110 is coupled to a wide area network 120 via gateways 130. Gateways 130 can be routers that provide firewall protection for wireless mesh network 110. Gateways 130 are coupled via wired or wireless connections to one or more routers within the network (as illustrated, coordinator router node 140). As discussed above, coordinator router node 140 is a router configured to handle network coordinator tasks associated with wireless mesh network 110. Such network coordinator tasks are dependent upon the nature of wireless mesh network 110. Router nodes 150 are FFDs that are configured to maintain tables related to those nodes connected to the router and paths to other nodes within the network. Router nodes 150 are configured to transmit and receive messages from nodes coupled to them, perform tasks related to those messages, and forward messages to coupled nodes, as necessary. Router nodes 150 can also provide sensor, alarm, and other functionality as needed for the network configuration.

Wireless mesh network 110 also includes end nodes 160 that are coupled to associated router nodes 150. End nodes 160 can be either FFDs or RFDs, depending upon the nature of the tasks performed by the wireless mesh network. In some network configurations, end nodes 160 are devices that are not required to be in an active mode all the time and can therefore go into a low power, or sleepy, mode. Such end devices would not provide router functionality because of the need to be in an awake state most of the time. End nodes can include sensor devices, light switches, and the like, depending upon the nature of the network application.

Examples of WPAN networks include Zigbee, Thread, 6LoWPAN, SNAP, WirelessHART, and the like. Embodiments of the present invention are not limited to the type of WPAN network.

Nodes are added to wireless mesh network 110 through a parent-child relationship between a new node and a node that is already a member of the network. As nodes join the network, the network node with which they communicate during the network association process is defined as the node's parent, and the joining node becomes a child of the parent node. In FIG. 1, for example, end device B is a child of router node A. Similarly, router node A is a child of router node C. The lines in FIG. 1 indicate parent-child relationships, and not all of the communication links.

All nodes in the network are configured to communicate using the same channel. Nodes within the wireless mesh network can communicate with more than just their parent. There are usually alternate communication paths through the network to sustain a connection. Nodes communicate through the network using a next-hop routing algorithm, wherein outgoing messages are sent through the gateway nodes.

In a typical wireless mesh network, if a single node becomes unreachable, that node is considered inactive or dead. Mesh network routing is flexible so that, in the case of a router node 150 becoming unreachable, the network can route around the inactive router. Further, if a coordinator router node 140 becomes unreachable, the network can move the coordinator responsibilities to another router node and resume operation seamlessly. But if a node is of critical importance from an application perspective, then it may be desirable to determine if the unreachability of the node is due to bad link conditions associated with the currently used RF channel. If communications with the unreachable node can be resumed using a different channel, then it may be desirable to trigger a network-wide channel switch to recover connectivity with the critical node.

In order to determine whether an unreachable node is available via a different channel, some systems use a mechanism that causes the parent to transmit during a first period on a first channel while the child cycles through each available channel, then during a second period the parent transmits on a second channel while the child cycles through each available channel, and then during subsequent periods the parent transmits on the remaining associated channels while the child cycles through each available channel, until a communication is obtained or there is no resumption of communication. The child node listens for signals from the parent and if signals are received, the child responds. Cycling through each channel in this manner can take significant power resources and time for both nodes, and can make the parent unavailable for communication with other nodes in the network.

Figure 2:
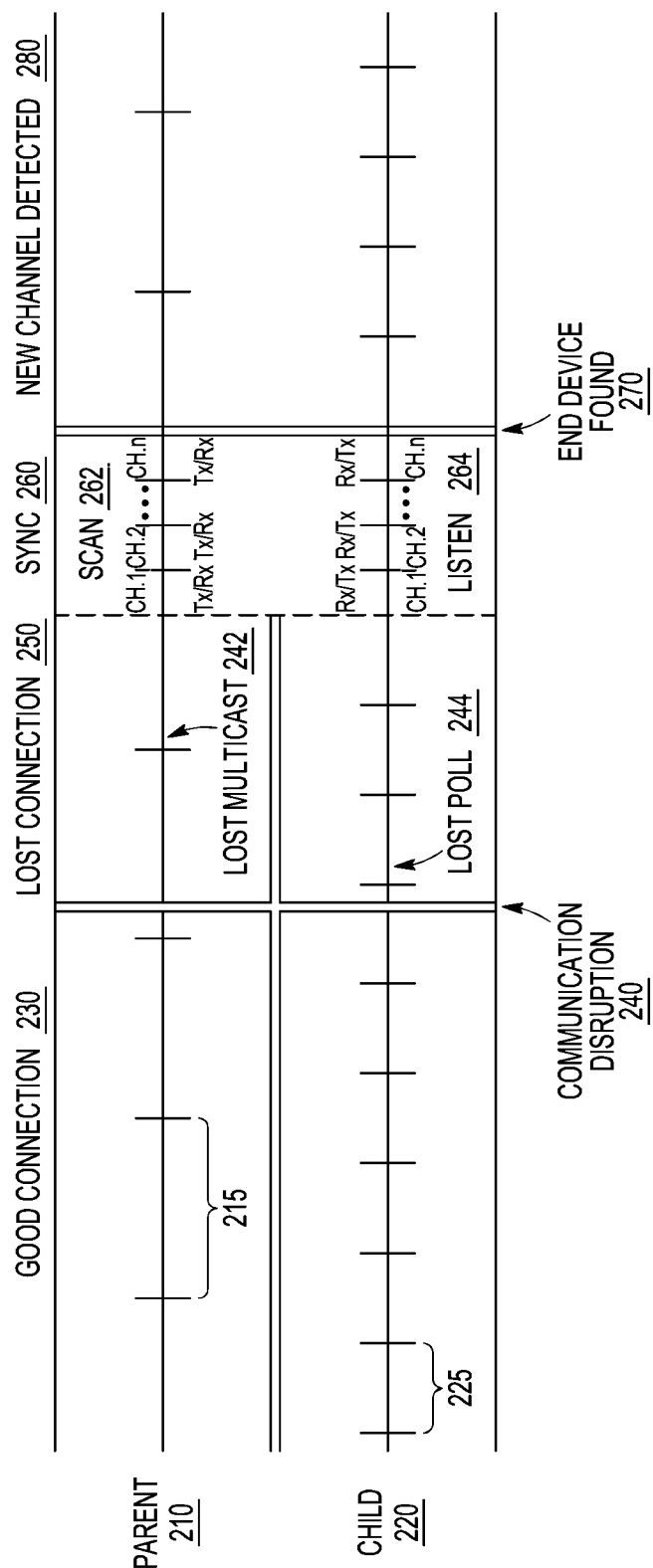
FIG. 2 is a simplified timeline diagram illustrating loss of communication and resumption of communication between a parent and child node in accord with embodiments of the present invention.

FIG. 2 is a simplified timeline diagram illustrating loss of communication and resumption of communication between a parent and child node in accord with embodiments of the present invention. Timeline 200 illustrates a sequence of events for a parent node (210) and a child node (220). During periods of good communication (e.g., 230), the parent node transmits a multicast signal to all child nodes at a multicast periodicity 215. Multicast signal transmission is indicated by the hash marks on the parent timeline. Likewise, during periods of good communication, the child node transmits a poll signal to the parent node at poll signal periodicity 225. As long as the child receives the multicast signal and the parent receives the poll signal, both nodes know that they are in communication with each other.

At time 240, a communication disruption occurs. The child becomes aware of the loss of communication when the child fails to receive the next multicast message from the parent (e.g., lost multicast 242). The parent becomes aware of the loss of communication when the parent fails to receive the next poll message from the child (e.g., lost poll 244). At this point, the parent and the child wait until after the next multicast period to begin a synchronized effort to re-establish communication (i.e., lost connection period 250).

During sync period 260, both the parent and the child nodes perform scanning and listening operations on each available channel. Sync period 260 is the same length as the multicast period for the parent-child system. The sync period is divided into a number of equal length scan periods equal to the number of available channels. As illustrated, the parent node will engage in a scan operation 262 wherein the parent will transmit a synchronization message on a channel during an associated scan period and listen for a response from the child node. At the same time, the child node will engage in a listen operation 264 wherein the child will listen for the synchronization message on each channel during the scan period and transmit the response if the child receives the synchronization message. In this manner, each available channel can be tested during the sync period.

If by the end of the sync period the end device is found (e.g., time 270), then the system enters a new channel detected period 280. As will be discussed more fully below, during this period the parent then communicates with the network coordinator node (e.g., coordinator router 140) to determine whether the wireless mesh network should switch the operating channel to the new channel on which communication with the child node could be reestablished. The network coordinator node can decide whether to switch channels in light of various factors, including the criticality of the child node to the overall operation of the system operating the wireless mesh network. During new channel detected period 280, and before a switch to a new channel, the parent node can resume transmitting multicast messages on the original channel to all other child nodes of the parent node.

It should be noted that during sync period 260, the parent and child nodes do not necessarily have to cycle through every available channel. If the two nodes can communicate on a channel before cycling through every channel, then the nodes can stop the synchronization process at that point. If the parent and child cannot communicate during sync period 260, then the parent node can make a determination that the child node is unresponsive and report that to the network coordinator node. Alternatively, the parent and child nodes can be configured to attempt synchronization multiple times during consecutive or non-consecutive multicast periods. If, then, after the multiple attempts, the parent node can make the decision that the child node is unresponsive.

Figure 3:
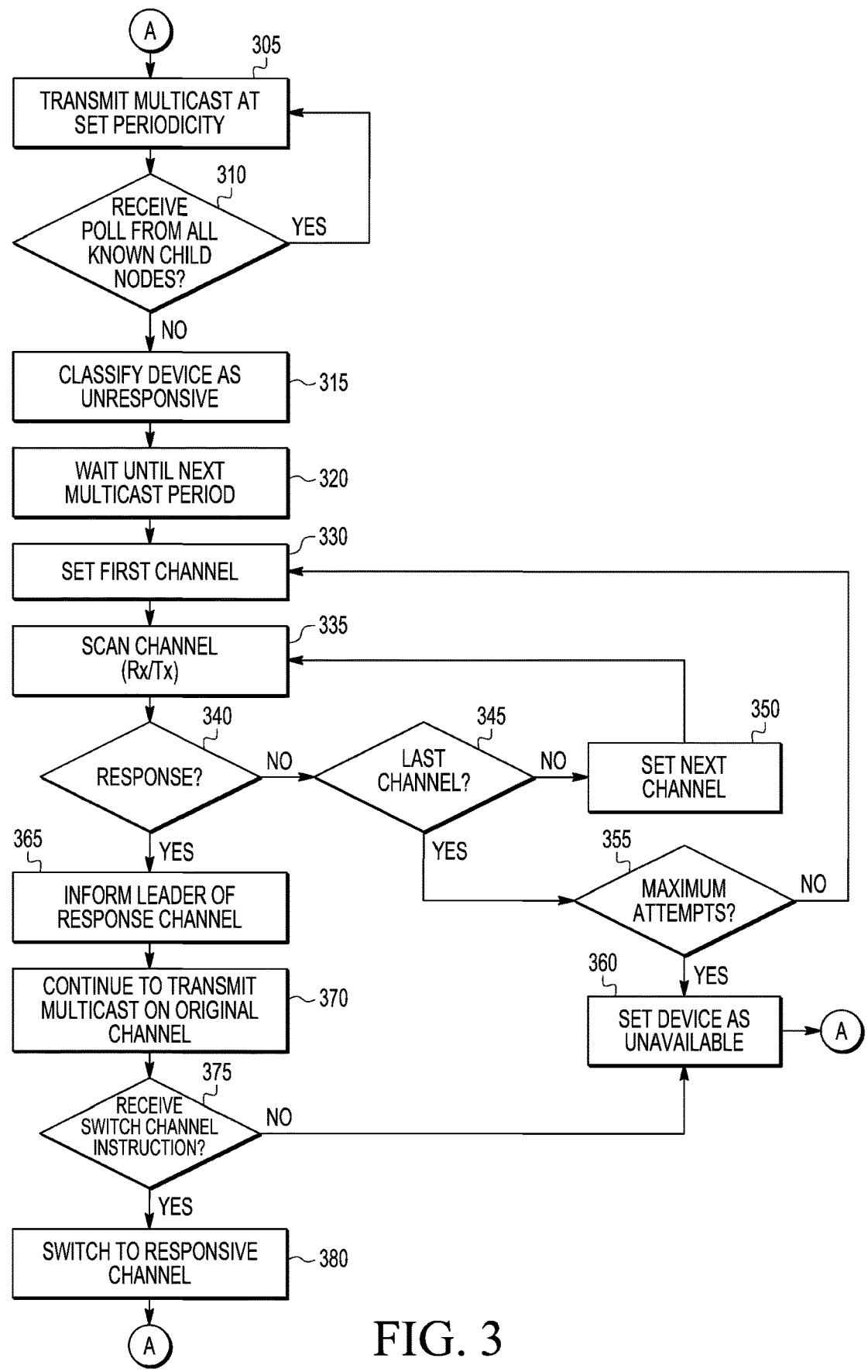
FIG. 3 is a simplified flow diagram illustrating a parent node process to resume communication with an unresponsive child node, in accord with embodiments of the present invention.

FIG. 3 is a simplified flow diagram illustrating a parent node process to resume communication with an unresponsive child node, in accord with embodiments of the present invention. As illustrated in FIG. 2, the parent node transmits a multicast message to all of the parent's child nodes at a set periodicity (305). This periodicity is set with the child node at the time of the addition of the child to the wireless mesh network, or alternatively is preconfigured. Thus, the child node expects to receive the multicast message and should the child node not receive the multicast message then there may be a problem with communicating on the set channel. The parent also periodically listens for a poll message from each of the parent node's child nodes (310). As with the multicast message from the parent, each child node transmits a poll message at a set periodicity, and the set periodicity is less than that of the multicast message from the parent. The poll message periodicity is also set with the parent at the time of adding the child node to the wireless network, or is preconfigured. If the parent node receives the child node's poll message, then the parent continues with the multicast transmit-poll message listen process.

If the parent node does not receive a poll message from one child node, then the parent node determines that there may be a problem with communicating on the set channel and will classify the child node as unresponsive (315). The parent node will wait until the beginning of the next multicast period (320) to begin a sync process with the child node. As the sync period begins, the parent node can divide up the next multicast period by the number of available channels to determine a length of a scan period. The parent node can then set to the first available channel (330) and scan on that channel (335) for a first associated scan period. The scan process is a transmission of a synchronization signal on the channel and then monitoring the channel for a response from the child node.

If there is no response from the child node on the first channel (340) in the first associated scan period, then the parent determines if the parent is on the last channel of the available channels (345), and if not then sets to the next channel (350) and performs the scan process on that next channel (335) for a next associated scan period. If no response is received, this process continues until the last channel has been scanned (345) and at that point the parent node can make a determination of whether a maximum number of attempts at resuming communication (355). If the maximum number of attempts has not been made, then the sync process can begin again with the first channel (330), and if the maximum number of attempts has been made, then the child node can be set as unresponsive (360) and the parent node can resume normal operation with the remaining child nodes, if any. Once a determination has been made that the child node is unavailable on any channel, the parent can inform the network coordinator node or perform other tasks related to the removal of a child node, as determined by the application.

If there is a response from the child node (340) on a channel other than the original channel, then the parent node can inform the network coordinator node of the responsive channel and the identity of the child (365). In an alternate embodiment, if there is a response from the child node (e.g., 340), the parent node can record the identification of the responsive channel and continue the scan process for the remaining channels to determine all the channels with which communication can be restored (not illustrated). The parent node can then inform the network coordinator node of all the responsive channels and the identity of the child.

In both embodiments, the parent node can then continue to transmit multicast signals on the original channel to the parent's other child nodes (370) and other normal operations (e.g., at initial block A). If the parent receives notification from the network coordinator node to switch channels (375), then the parent can engage in the process of switching channels with all child nodes (380) to resume communication with the previously unavailable child node. If the parent does not receive instruction to switch channels (375), then the parent node can set the child node as unavailable (360) and resume normal operation with the remaining child nodes, if any.

Figure 4:
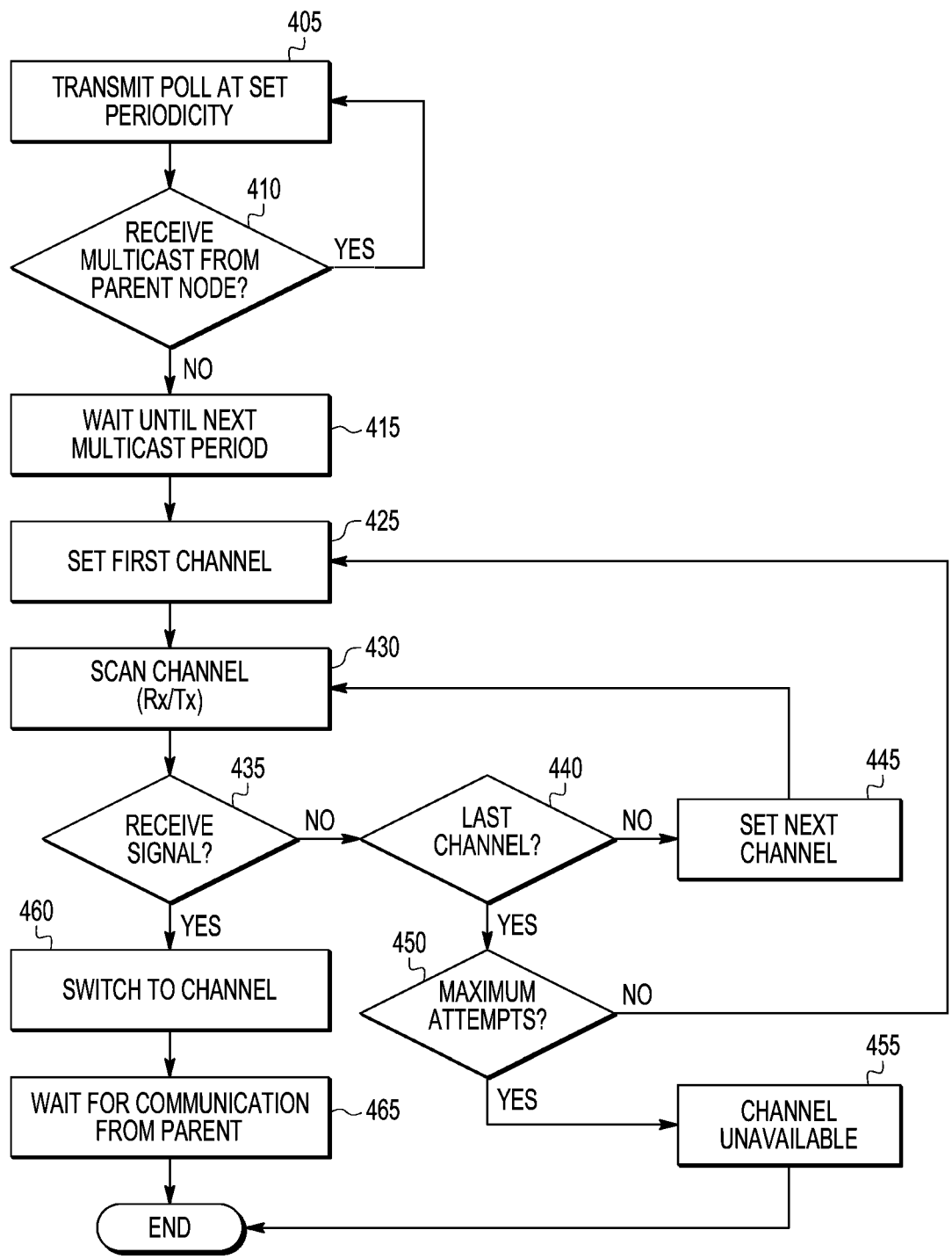
FIG. 4 is a simplified flow diagram illustrating a child node process to resume communication with an unreachable parent node, in accord with embodiments of the present invention.

FIG. 4 is a simplified flow diagram illustrating a child node process to resume communication with an unreachable parent node, in accord with embodiments of the present invention. As illustrated in FIG. 2, the child node transmits a poll message at a set periodicity (405). The child node also listens for the multicast transmission from the parent node (410). The poll periodicity is set to be less than that of the multicast periodicity so as to ensure that the parent and child nodes can start a sync period 260 at the same time. That is, to ensure that the parent node will not receive a poll message prior to the child node expecting the next multicast message.

If the child receives a multicast message, then the process of transmitting a poll and listening for a multicast message continues. If no multicast message is received (410), then the child waits until the next multicast period to begin the sync process (415). As the sync period begins, the child node can divide up the next multicast period by the number of available channels. The child node can then set to the first available channel (425) and scan on that channel (430). The scan process for the child is to monitor for the synchronization signal from the parent node on that channel and then transmit a response on that channel to the parent node, if a signal is received.

If a signal is not received on a channel (435), then a determination is made as to whether the child is listening on the last available channel (440). If not, then the child sets to monitor the next available channel (445) and scans on that channel (430). If the last available channel has been monitored, then the child determines if the maximum number of attempts to regain communication have been made (450). If not, then the child begins the channel scanning process again (425). If the maximum number of attempts to regain communication have been made then there is no channel available (455) and the child can perform any actions the child is configured to for such a case (e.g., go into sleep mode, shut down, and the like).

If a signal is received on a channel (435), then the child can switch to that channel (460). Once the child has switched to that channel, the child can wait for communication from the parent to resume (465). In an alternate embodiment, if a signal is received on a channel (e.g., 435), the child can record the identity of that channel in the child's memory and continue the scan process to determine if there are other channels on which the child can regain communication with the parent (not illustrated). The child can then scan all the available channels for communication with the parent to resume. If the child does not receive further communications from the parent (e.g., multicast signals) on the new channel, this may be indicative of the network coordinator node not confirming the switch to the new channel by the network, as discussed above.

As discussed above, embodiments of the present invention can be used in a variety of WPAN networks including a variety of node types. One type of network node in a WPAN network for which embodiments of the present invention can be implemented is an internet of things (IoT) sensor node. A WPAN network including IoT nodes can provide distributed sensor and other apparatus functionality throughout an environment incorporating the WPAN network.

Figure 5:
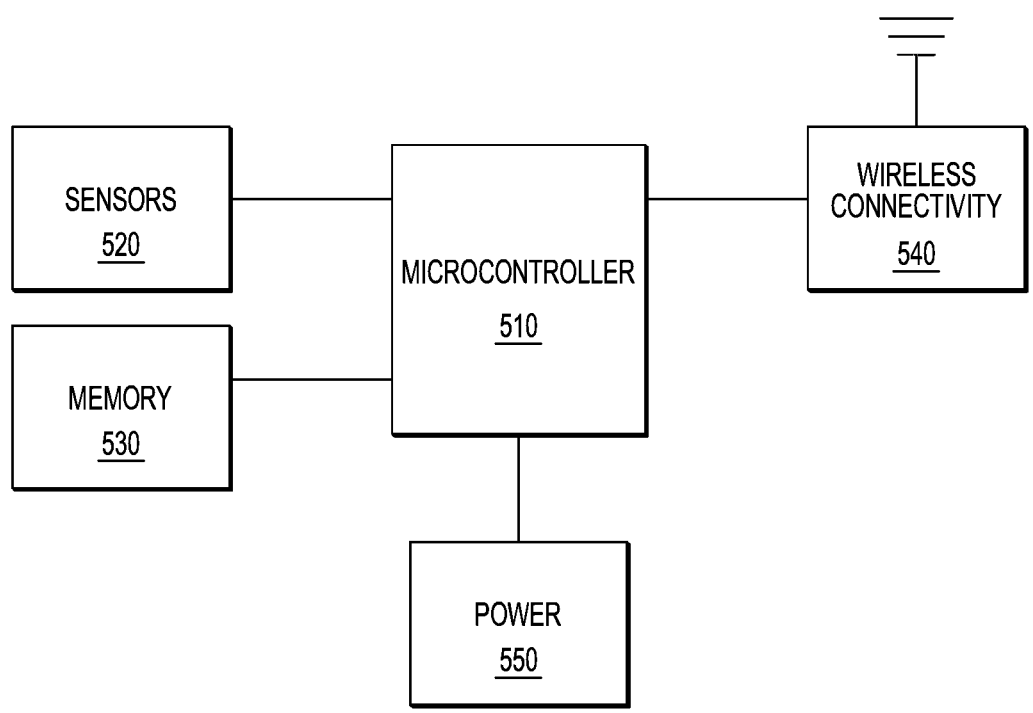
FIG. 5 is a simplified block diagram illustrating components of an example IoT sensor node 500 that can incorporate embodiments of the present invention.

FIG. 5 is a simplified block diagram illustrating components of an example IoT sensor node 500 that can incorporate embodiments of the present invention. IoT sensor node 500 incorporates a microcontroller (MCU) 510 programmed to receive data from sensors module 520 and provide information from that data to other network nodes via wireless connectivity module 540. MCU 510 can be a 8-, 16-, or 32-bit MCU, for example, in which low-to-medium complexity nodes use an 8- or 16-bit MCU, while high complexity nodes use a 32-bit MCU. The choice of MCU type can be dependent upon the data throughput needs and the power constraints of the application, for example. MCUs can have sensor interfaces, voltage regulators, and RF radios on chip, or those devices can be external to the MCU.

Sensors module 520 can include one or more of a variety of sensor types, including, for example, smart sensors, RFID or near field communication, optical sensors, image sensors, environmental sensors, and the like. Smart sensors are sensors that include data processing in the sensor. These can include, for example, environmental sensors that perform simple processing of the collected environmental data, or microelectromechanical systems (MEMS) sensors having a gyroscope and accelerometer with integrated digital processing for sensor fusion calculations. RFID or near field communication sensors can be configured to detect the presence of items identified with a RFID or NFC tag. Optical sensors are used to detect the presence of light in either visible or non-visible wavelengths. Image sensors are light sensitive sensor arrays (e.g., CCD) that translate an image into electrical signals. An environmental sensor is configured to detect the status of the environment around the sensor. Such information can include, for example, pressure, temperature, position, acceleration, motion, or orientation. Sensors in sensor module 520 can provide a digital output that is read by MCU 510.

In addition, sensors module 520 can include inputs for systems that provide an analog signal. In such cases, sensors module 520 can include an analog-to-digital converter (ADC), especially when a high speed or precision conversion is required by the application. Alternatively, in applications where an ADC is insufficient, sensors module 520 can include an analog front end that includes an ADC and signal conditioning circuitry to provide the digital signal to the MCU.

Memory module 530 can provide storage access to MCU 510 over and above the memory on board the MCU. For example, memory module 530 can include RAM or flash or removable memory to store programs for the MCU or other data.

Wireless connectivity module 540 is configured to provide communication between the IoT sensor node and other nodes in the network (e.g., a parent node or a child node). As discussed above, embodiments of the present invention can be used in a wireless mesh network such as that defined by IEEE 802.15.4. Such networks are typically used for low data rate, battery powered nodes distributed over a wide area. The wireless connectivity module can be configured to transmit and receive data with one or more other nodes in the network.

Power module 550 provides the correct voltage to MCU 510 and also manage the battery to help increase battery life and ensure that proper charging current and voltage is applied. Power module 550 can also include low loss voltage regulators and step up/step down voltage converters to help ensure that the IoT sensor node is operating at the correct voltage.

By now it should be appreciated that there has been provided a method, performed by a network node in a wireless personal area network, for restoring communication with a neighbor network node. The method includes determining that the neighbor network node is unresponsive on a first communication channel; sequentially scanning available communication channels, in response to determining that the neighbor network node is unresponsive, in order to identify a second communication channel that enables reestablishing communication with the neighbor network node; informing a coordinator node of the wireless personal area network of an identity of the second communication channel when the sequentially scanning provides the identity of the second communication channel and the second communication channel is not the same as the first communication channel; and, logging the neighbor network node as unresponsive when the sequentially scanning does not provide an identity of the second communication channel. The sequentially scanning begins at a first time agreed upon with the neighbor network node prior to determining that the neighbor network node is unresponsive.

In one aspect of the above embodiment, the sequentially scanning includes sequentially selecting one of the available communication channels at the start of an associate scan period, transmitting a signal on the selected communication channel, identifying the selected communication channel as the second communication channel in response to receiving an acknowledgement signal from the neighbor network node, and proceeding to the next associated scan period. In a further aspect, each scan period is equal to a sync period divided by a number of available communication channels, and the sync period is determined by the network node.

In another further aspect, determining that the neighbor network node is unresponsive further includes monitoring the first communication channel of the available communication channels for a poll signal periodically sent by the neighbor network node at a polling periodicity, and when the poll signal is not received at an expected signal receipt time of the polling periodicity, setting the neighbor network node as unresponsive. A further aspect includes periodically transmitting, by the network node, a multicast signal to the neighbor network node at a multicast periodicity on the first communication channel, where the multicast periodicity has a longer period between multicast transmission than that of the polling periodicity, and the first time agreed upon with the neighbor network node for beginning the scanning is a first multicast signal time associated with the multicast periodicity after not receiving the poll signal. In a still further aspect, each scan period is equal to the multicast periodicity divided by a number of available communication channels.

In another aspect, the method includes discontinuing the sequentially scanning in response to receiving the acknowledgement signal from the neighbor network node prior to the end of the associated scan period. In yet another aspect, the method further includes proceeding through each available communication channel to identify a set of second communication channels with which communication can be restored with the neighbor network node.

In another aspect of the above embodiment, the method further includes transmitting signals to other neighbor network nodes on the first communication channel after informing the coordinator node of the second communication channel. In a further aspect, after informing the coordinator node of the second communication channel, the method further includes receiving an instruction from the coordinator node to switch to the second communication channel, transmitting to the other neighbor network nodes information regarding the switch to the second communication channel, and transmitting multicast messages on the second communication channel at a multicast periodicity.

Another embodiment of the present invention provides a method, performed by a network node, for restoring communication with a neighbor network node in a wireless personal area network. The method of this embodiment includes: determining that the neighbor network node is unresponsive on a first communication channel; sequentially monitoring available communication channels for a communication from the neighbor network node in response to determining that the neighbor network node is unresponsive in order to identify a second communication channel that enables reestablishing communication with the neighbor network node; transmitting a response to the neighbor network node on the second communication channel when the sequentially monitoring provides an identity of the second communication channel; and, monitoring the second communication channel for further communication from the neighbor network node. The scanning begins at a first time agreed upon with the neighbor network node prior to determining that the neighbor network node is unresponsive.

In one aspect of the above embodiment, sequentially monitoring available communication channels for communication from the neighbor network node includes: sequentially selecting one of the available communication channels at the start of an associated scan period; monitoring for a signal from the neighbor network node on the selected communication channel during the associated scan period; identifying the selected communication channel as the second communication channel in response to receiving the signal from the neighbor network node prior to the end of the associated scan period; and, proceeding to the next associated scan period. In a further aspect, each scan period is equal to a sync period divided by a number of available communication channels and the sync period is determined by the network node.

In another further aspect of the above embodiment, determining that the neighbor network node is unresponsive further includes monitoring the first communication channel of the available communication channels for a multicast signal periodically sent by the neighbor network node at a multicast periodicity, and setting the neighbor network node as unresponsive if the multicast signal is not received at an expected signal receipt time. In a further aspect, the first time agreed upon with the neighbor network node for beginning the monitoring is a first multicast signal time associated with the multicast periodicity after not receiving the multicast signal. In a still further aspect, each scan period is equal to the multicast periodicity divided by a number of available communication channels.

In another aspect of the above embodiment, the method includes discontinuing the sequentially scanning in response to the sequentially monitoring providing an identity of the second communication channel. In another aspect of the above embodiment, the method includes proceeding through each available communication channel to identify a set of second communication channels with which communication can be restored with the neighbor network node.

In another aspect of the above embodiment, the method further comprises periodically transmitting, by the network node, a polling signal to the neighbor network node at a polling periodicity on the first communication channel.

Another embodiment of the present invention provides a network node communicatively coupled to a neighbor network node in a wireless personal area network. The network node includes wireless connectivity circuitry and microcontroller circuitry. The wireless connectivity circuitry is configured to communicate with the neighbor network node on a first communication channel and communication with a coordinator node of the wireless personal area network on the first communication channel. The microcontroller circuitry is coupled to the wireless connectivity circuitry, and is configured to: determine that the neighbor network node is unresponsive on the first communication channel; cause the wireless connectivity circuitry to sequentially scan available communication channels in response to determining that the neighbor network node is unresponsive in order to identify a second communication channel that enables reestablishing communication with the neighbor network node; cause the wireless connectivity circuitry to transmit a message to the coordinator node identifying the second communication channel when the sequential scan provides the identity of the second communication channel and when the second communication channel is not the same as the first communication channel; and, store, in a memory coupled to the microcontroller circuitry, a log entry that the neighbor network node is unresponsive if the sequential scan does not provide an identity of the second communication channel.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Some of the above embodiments, as applicable, may be implemented using a variety of different information processing systems. For example, although FIG. 5 and the discussion thereof describe an exemplary network node architecture, this exemplary architecture is presented merely to provide a useful reference in discussing various aspects of the invention. The description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of any software described herein may be received elements of system 510, for example, from non-transitory computer readable media such as memory module 530 or other media on other computer systems. Such non-transitory computer readable media may be permanently, removably or remotely coupled to the system. The computer readable media may include, for example and without limitation, any number of the following: nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

In some embodiments, a wireless mesh network 110 can include a computer system such as a personal computer system as a network node. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, wireless mesh network 110 need not be a IEEE 802.15.4 type network. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method, performed by a network node, for restoring communication with a neighbor network node in a wireless personal area network, the method comprising:
    determining that the neighbor network node is unresponsive on a first communication channel, wherein said determining that the neighbor network node is unresponsive comprises
        monitoring the first communication channel for a poll signal periodically sent by the neighbor network node at a polling periodicity, and
        when the poll signal is not received at an expected signal receipt time of the polling periodicity, setting the neighbor network node as unresponsive;
    sequentially scanning available communication channels, in response to said determining that the neighbor network node is unresponsive, in order to identify a second communication channel that enables reestablishing communication with the neighbor network node, wherein
        said sequentially scanning begins at a first time agreed upon with the neighbor network node prior to said determining that the neighbor network node was unresponsive, and
        said sequentially scanning comprises
            sequentially selecting one of the available communication channels at a start of an associated scan period,
            transmitting a signal by the network node to the neighbor network node on the selected communication channel and waiting a time period for a response from the neighbor network node,
            in response to receiving an acknowledgement signal from the neighbor network node prior to an end of the associated scan period, identifying the selected communication channel as the second communication channel, and proceeding to the next associated scan period;

periodically transmitting, by the network node, a multicast signal to the neighbor network node at a multicast periodicity on the first communication channel, wherein the multicast periodicity has a longer period between multicast transmission than that of the polling periodicity, and the first time agreed upon with the neighbor network node for beginning said sequentially scanning is a first multicast signal time associated with the multicast periodicity after not receiving the poll signal;

informing a coordinator node of the wireless personal area network of an identity of the second communication channel when said sequentially scanning provides the identity of the second communication channel and when the second communication channel is not the same as the first communication channel; and logging the neighbor network node as unresponsive when said sequentially scanning does not provide the identity of the second communication channel.

2. The method of claim 1, wherein each scan period is equal to a sync period divided by a number of available communication channels; and the sync period is determined by the network node.

3. The method of claim 1, wherein each scan period is equal to the multicast periodicity divided by a number of available communication channels.

4. The method of claim 1 further comprising:

in response to receiving the acknowledgement signal from the neighbor network node prior to the end of the associated scan period, discontinuing said sequentially scanning.

5. The method of claim 1 further comprising:

proceeding through each available communication channel to identify a set of second communication channels with which communication can be restored with the neighbor network node.

6. The method of claim 1 further comprising:

after said informing the coordinator node of the second communication channel, transmitting signals to other neighbor network nodes on the first communication channel.

7. The method of claim 6 further comprising, after said informing the coordinator node of the second communication channel:

receiving an instruction from the coordinator node to switch to the second communication channel;

transmitting to the other neighbor network nodes information regarding the switch to the second communication channel; and transmitting multicast messages on the second communication channel at a multicast periodicity.

8. A method, performed by a network node, for restoring communication with a neighbor network node in a wireless personal area network, the method comprising:

determining that the neighbor network node is unresponsive on a first communication channel, wherein said determining that the neighbor network node is unresponsive comprises monitoring the first communication channel of the available communication channels for a multicast signal periodically sent by the neighbor network node at a multicast periodicity, and if the multicast signal is not received at an expected signal receipt time of the multicast periodicity, then setting the neighbor network node as unresponsive;

sequentially monitoring available communication channels for a communication from the neighbor network node, in response to said determining that the neighbor network node is unresponsive, in order to identify a second communication channel that enables reestablishing communication with the neighbor network node, wherein said sequentially monitoring begins at a first time agreed upon with the neighbor network node prior to said determining that the neighbor network node was unresponsive, and said sequentially monitoring comprises sequentially selecting one of the available communication channels at a start of an associated scan period, monitoring for a signal from the neighbor network node on the selected communication channel during the associated scan period, in response to receiving the signal from the neighbor network node prior to an end of the associated scan period, identifying the selected communication channel as the second communication channel, and proceeding to the next associated scan period;

transmitting a response to the neighbor network node on the second communication channel when said sequentially monitoring provides an identity of the second communication channel; and monitoring the second communication channel for further communication from the neighbor network node.

9. The method of claim 8, wherein each scan period is equal to a sync period divided by a number of available communication channels; and the sync period is determined by the network node.

10. The method of claim 8, wherein the first time agreed upon with the neighbor network node for beginning said monitoring is a first multicast signal time associated with the multicast periodicity after not receiving the multicast signal.

11. The method of claim 10, wherein each scan period is equal to the multicast periodicity divided by a number of available communication channels.

12. The method of claim 8 further comprising:

in response to said sequentially monitoring providing an identity of the second communication channel, discontinuing said sequentially scanning.

13. The method of claim 8 further comprising:

proceeding through each available communication channel to identify a set of second communication channels with which communication can be restored with the neighbor network node.

14. The method of claim 8 further comprising periodically transmitting, by the network node, a polling signal to the neighbor network node at a polling periodicity on the first communication channel.

15. A network node communicatively coupled to a neighbor network node in a wireless personal area network, the network node comprising:

wireless connectivity circuitry configured to communicate with the neighbor network node on a first communication channel, and communicate with a coordinator node of the wireless personal area network on the first communication channel; and microcontroller circuitry, coupled to the wireless connectivity circuitry, and configured to determine that the neighbor network node is unresponsive on the first communication channel, wherein the microcontroller circuitry determines that the neighbor network node is unresponsive by being further configured to monitor the first communication channel for a poll signal periodically sent by the neighbor network node at a polling periodicity, and when the poll signal is not received at an expected signal receipt time of the polling periodicity, set the neighbor network node as unresponsive, cause the wireless connectivity circuitry to sequentially scan available communication channels, in response to determining that the neighbor network node is unresponsive, in order to identify a second communication channel that enables reestablishing communication with the neighbor network node, wherein the sequential scan begins at a first time agreed upon with the neighbor network node prior to determining that the neighbor network node was unresponsive, and said sequential scan comprises sequentially selecting one of the available communication channels at the start of an associated scan period, transmitting a signal by the network node to the neighbor network node on the selected communication channel and waiting a time period for a response from the neighbor network node, in response to receiving an acknowledgement signal from the neighbor network node prior to an end of the associated scan period, identifying the selected communication channel as the second communication channel, and proceeding to the next associated scan period, cause the wireless connectivity circuitry to periodically transmit a multicast signal to the neighbor network node at a multicast periodicity on the first communication channel, wherein the multicast periodicity has a longer period between multicast transmission than that of the polling periodicity, and the first time agreed upon with the neighbor network node for beginning said sequentially scanning is a first multicast signal time associated with the multicast periodicity after not receiving the poll signal, and cause the wireless connectivity circuitry to transmit a message to the coordinator node identifying the second communication channel when the sequential scan provides the identity of the second communication channel and when the second communication channel is not the same as the first communication channel, and store, in a memory coupled to the microcontroller circuitry, a log entry that the neighbor network node is unresponsive if the sequential scan does not provide an identity of the second communication channel.

* * * * *